United States Patent [19]
Foss et al.

[11] Patent Number: 5,367,681
[45] Date of Patent: Nov. 22, 1994

[54] METHOD AND APPARATUS FOR ROUTING MESSAGES TO PROCESSES IN A COMPUTER SYSTEM

[75] Inventors: Carolyn L. Foss, Palo Alto; Dwight F. Hare, Menlo Park; Richard F. McAllister, Palo Alto; Tin A. Nguyen, Danville; Amy Pearl, Mountain View; Sami Shaio, Palo Alto, all of Calif.

[73] Assignee: Sun Microsystems, Inc., Mountain View, Calif.

[21] Appl. No.: 147,019

[22] Filed: Nov. 2, 1993

Related U.S. Application Data

[63] Continuation of Ser. No. 627,735, Dec. 14, 1990, abandoned.

[51] Int. Cl.5 .............................................. G06F 9/44
[52] U.S. Cl. .................................... 395/650; 395/700; 364/DIG. 7; 364/280; 364/281.3; 364/284; 364/284.3
[58] Field of Search ............................. 395/650, 700; 364/DIG. 1, DIG. 2

[56] References Cited

U.S. PATENT DOCUMENTS

| | | | |
|---|---|---|---|
| 4,394,725 | 7/1983 | Bienvenu et al. | 364/200 |
| 4,395,757 | 7/1983 | Bienvenu et al. | 364/200 |
| 4,412,285 | 10/1983 | Neches et al. | 364/200 |
| 4,466,060 | 8/1984 | Riddle | 364/200 |
| 4,630,196 | 12/1986 | Bednar, Jr. et al. | 364/200 |
| 4,818,984 | 4/1989 | Chang et al. | |
| 5,036,459 | 7/1991 | den Haan et al. | |
| 5,124,909 | 6/1992 | Blakely et al. | 395/200 |
| 5,212,792 | 5/1993 | Gerety et al. | 395/650 |

FOREIGN PATENT DOCUMENTS

| | | |
|---|---|---|
| 0274413 | 7/1988 | European Pat. Off. |
| WO92/13309 | 8/1992 | WIPO |

Primary Examiner—Kevin A. Kriess
Assistant Examiner—J. H. B. Hall Backenstose
Attorney, Agent, or Firm—Blakely Sokoloff Taylor & Zafman

[57] ABSTRACT

A method and apparatus for interprocess message switching between a sender process and a plurality of receiver processes is disclosed. Messages supported comprise request and notice messages. Receiver processes supported comprise handler processes and observer processes. Request messages may be observed as well as handled, and notice messages may be handled as well as observed. Handler and observer processes may be non-executing as well as executing. Sender processes do not need to specify the identity of the receiver processes. The sender process and the receiver processes may be executed on the same computer or on two or more computers in a network.

55 Claims, 6 Drawing Sheets

FIG_3

FIG_6

METHOD AND APPARATUS FOR ROUTING MESSAGES TO PROCESSES IN A COMPUTER SYSTEM

This is a continuation of application Ser. No. 07/627,735, filed Dec. 14, 1990, now abandoned.

BACKGROUND OF THE INVENTION

1. Field of the Invention

The present invention relates to the field of computer systems. In particular, the present invention is a method and apparatus for interprocess message switching between a sender process and a plurality of receiver processes.

2. Art Background

Conventional interprocess communication facilities provide the capability of handling few message types or methods of message distribution. Typical facilities support point-to-point distribution of request messages and multicast distribution of notice messages between processes. A process is an instance of a program, an executable file, in the process of execution. A request is a call for one process to act for another. A request is usually delivered point-to-point, that is to one process (called the request handler), or is returned as undeliverable. A request entails a reply message from the request handler to the request sender. The reply indicates the results of the request. A notice is an announcement by one process that an event has occurred. A notice is usually multicasted and is delivered to a set of processes (called observers). A notice entails no reply from the observer and produces no effect on the sender, even if the notice is undeliverable. A process may act as a sender, a handler or an observer at different points during its execution.

The conventional point-to-point distribution of requests and the multicast distribution of notices have at least two shortcomings:

(1) the strict dichotomy between request and notice is inflexible, a request cannot be observed and a notice cannot be handled;

(2) the sender is burdened with identifying the message receivers.

These shortcomings have hindered the development of cooperative multiprocess applications, especially in a networked environment. For instance, a notice may need to be handled in addition to being observed. In the case where a process announces that it has created an object by sending a notice, a file containing a count of these objects should be updated as a result of the notice. To ensure the count is incremented once, one process should handle the notice while other interested processes can observe it. Under the conventional interprocess communication facilities, the updating of the count cannot be achieved with a single notice because there is no guarantee that exactly one process will update the count. A second example is where one process might keep a log of the requests made by other processes, for the purpose of allowing the other processes to review or re-execute requests. A process that can observe request messages can easily accomplish the task of reviewing or re-executing the request. Finally, the dynamic nature of processes makes it difficult for a sender process to know which processes should receive a message.

As will be described, the present invention overcomes the disadvantages of the prior art, and provides a method and apparatus for improved interprocess message switching between a sender process and a plurality of receiver processes.

SUMMARY OF THE INVENTION

It is therefore an object of the present invention to improve interprocess message switching between a sender process and a plurality of receiver processes, particularly switching of request and notice messages.

It is another object of the present invention that request messages may be observed as well as handled, and notice messages may be handled as well as observed.

It is another object of the present invention that request and notice messages may be sent by sender processes without having to know the identity of the receiver processes.

It is another object of the present invention that request and notice messages may be sent by sender processes to non-executing as well as executing receiver processes.

These objects are realized by the method and apparatus for interprocess message switching between a sender process and a plurality of receiver processes of the present invention. The preferred embodiment of the method comprises the steps of registering the receiver processes with the apparatus, selecting the registered receiver processes to receive messages received from the sender process, queuing copies of the received messages for the selected receiver processes, executing or non-executing, disposing the received messages, signaling the selected receiver processes regarding the availability of the queued messages, and delivering the queued messages when requested by the signaled receiver processes. The apparatus comprises various means for accomplishing the steps of registering, selecting, queuing, signaling, and delivering.

For disposing the received messages, the preferred embodiment of the method further comprises the steps of registering the sender process, discarding notice messages and replying to request messages. Likewise, the apparatus further comprises various means for accomplishing the steps of discarding and replying.

For replying to request messages with no selected handler processes, the preferred embodiment of the method further comprises the steps of updating the request messages with the results, selecting the registered observer processes to receive the reply messages, queuing copies of the reply messages for the sender process and the selected observer processes, executing and non-executing, signaling the sender process and the executing selected observer processes regarding the availability of the queued reply messages, and delivering the queued reply messages when requested by the signaled sender/observer processes. Similarly, the apparatus further comprises various means for accomplishing the steps of updating, selecting, signaling and delivering.

For replying to request messages with selected handler processes, the preferred embodiment of the method further comprises the steps of queuing an additional copy of each of the request messages pending results, and dequeuing the result pending request messages upon receipt of the results from the handler processes, prior to the steps of updating, selecting, signaling, and delivering described above. Similarly, the apparatus further comprises various means for accomplishing the steps of queuing and dequeuing.

Registration of the receiver processes comprises registering message patterns, signaling ways and program type identifiers. Registration of the sender process comprises registering signaling ways. Receiver and sender processes may register dynamically at their initialization or some later points during their execution.

Messages comprise a plurality of message attributes describing the messages. Message attributes comprise a message identifier, a message class and a message state. Message classes comprise "request" and "notice". Message states comprise "created", "sent", "handled", "queued", "started" and "failed".

Selection comprises selecting at most one handler process and any number of observer processes for each message. Both handler processes and observer processes are selected regardless of message class. Both executing as well as non-executing processes are selected. Processes are selected by matching message attributes. Matchings are performed against the registered message patterns and message patterns within message signatures contained in the program type definitions.

BRIEF DESCRIPTION OF THE DRAWINGS

FIG. 6 is a state diagram showing exemplary states of the apparatus for interprocess message switching of the present invention during its operation.

NOTATIONS AND NOMENCLATURE

The detailed description which follows are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The algorithms presented herein are not entirely related to any particular computer or other apparatus. In particular, various general purpose machines may be used with programs written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for interprocess message switching having particular application for switching messages between a sender process and a plurality of receiver processes being executed by one or more computers on a network is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

1. OVERVIEW

Figure 1:
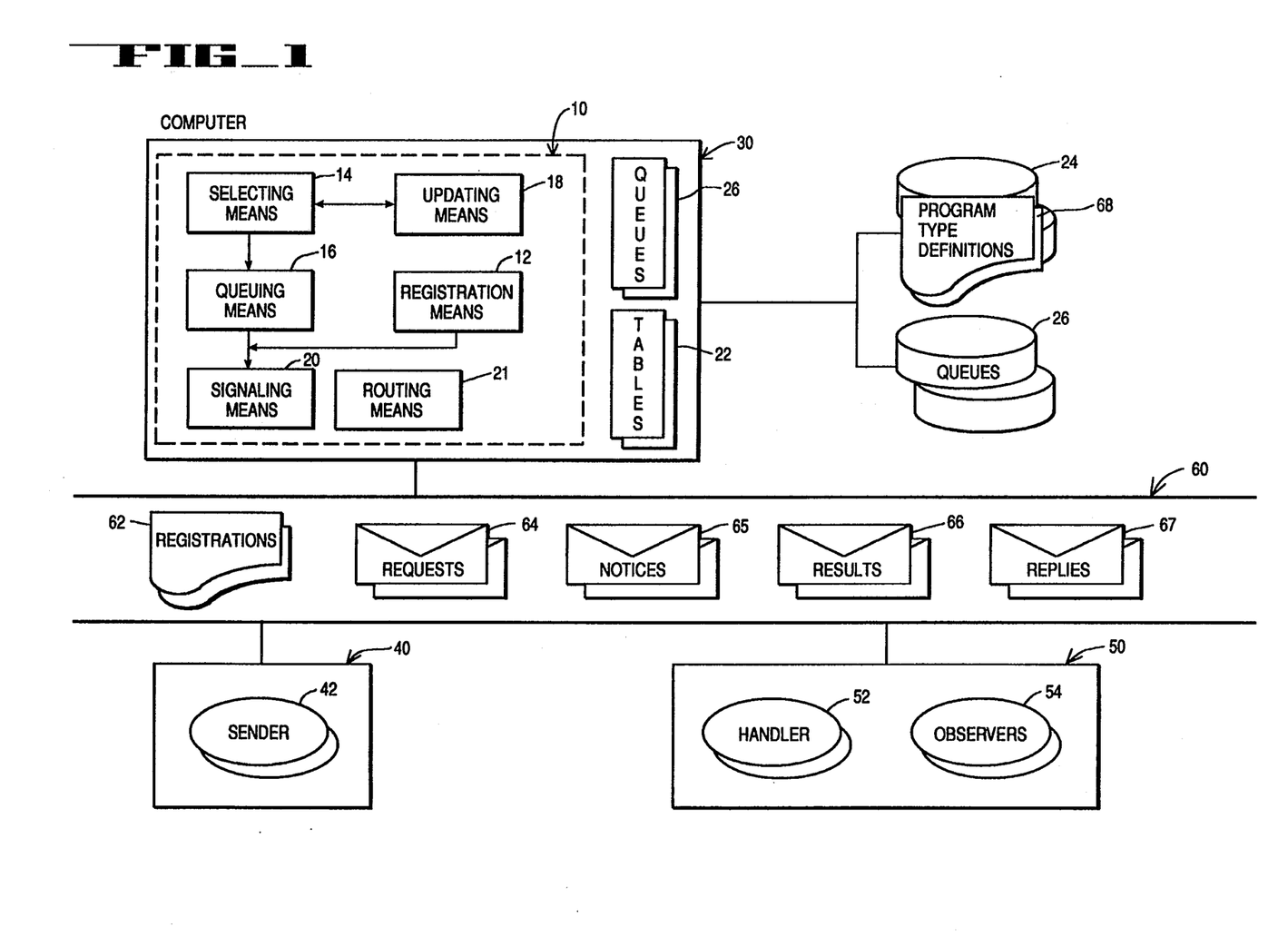
FIG. 1 is a block diagram illustrating the apparatus of the present invention for interprocess message switching between a sender process and a plurality of receiver processes.

Referring now to FIG. 1, a block diagram of the preferred embodiment of the apparatus for interprocess message switching of the present invention 10 is shown. The apparatus 10 is shown in the context of a plurality of computers 30, 40, 50 connected to a network 60. The network of computers 30, 40, 50 comprises a plurality of sender processes 42 and a plurality of receiver processes 52, 54, sending messages 64–67 to each other. The receiver processes 52, 54 comprise handler processes 52 and observer processes 54. The messages 64–67 comprise request messages 64, notice messages 65, results 66 and reply messages 67.

The preferred embodiment of the apparatus for interprocess message switching of the present invention 10 comprises a registering means 12 comprising an interface (not shown) for receiving registrations 62 as inputs from the processes 42, 52, 54, a selecting means 14 comprising an interface (not shown) for receiving messages 64, 65 as inputs from the sender process 42, a queuing means 16 coupled to the selecting means 14, an updating means 18 coupled to the selecting means 14 and comprising an interface (not shown) for receiving results 66 as inputs from the receiver processes 52, 54, a signaling means 20 coupled to the registering means 12 and the queuing means 16 for outputting signals to the processes 42, 52, 54, and a delivering means 21 comprising an interface (not shown) for receiving acknowledgements from the processes 42, 52, 54 as inputs and outputting messages 64, 65, 67 to the processes 42, 52, 54.

2. REGISTERING MEANS

The registering means 12 is for registering receiver processes 52, 54 with the apparatus of the present invention 10. Registration of receiver processes 52, 54 comprises registering message patterns and signaling ways for each of the receiver processes 52, 54. Additionally, registration of receiver processes 52, 54 may further comprise registering a program type identifier for each of the receiver processes 52, 54.

The message patterns describe to the apparatus 10, the messages 64, 65, 67 which the registering receiver process 52, 54 is to receive. The signaling ways describe to the apparatus 10, how the registering receiver process 52, 54 is to be signaled regarding the availability of a message 64, 65, 67. The program type identifier describes to the apparatus 10 the program being executed by the registering receiver process 52, 54. The message patterns, signaling ways and the program type identifier will be discussed in further details later.

The registering means 12 comprises an interface (not shown) for receiving the registrations 62 for the registering processes 42, 52, 54 as inputs. The registering means 12 further comprises a plurality of processing means (not shown), each coupled to the registering interface, for processing these registrations 62, extracting the message patterns or the signaling ways contained therein, and storing them for subsequent usage by the selecting means 14 and the signaling means 20. If a registration 62 contains a program type identifier, the processing means extracts the program type identifier and generates message patterns, using a program type definition 68 identified by the program type identifier. The generated message patterns are also stored for subsequent usage by the selecting means 14. Additionally, the registering means 12 checks the program pending messages queues 26 and outputs to the signaling means 21 to signal the registering receiver processes 52, 54 regarding the availability of queued messages 64, 65. The program type definitions 68, the program pending messages queues 26 and the signaling means 21 will also be discussed in further details later.

The registering means 12 may receive the registrations 62 for the registering processes 42, 52, 54 directly from the registering processes 42, 52, 54 or indirectly from another source. The registering means may also receive the registrations 62 dynamically while the apparatus 10 is in operation or statically before the apparatus 10 is initialized. Preferably, the registrations 62 are provided to the registering means 12 directly by the registering processes 42, 52, 54 at their initialization or some later points during their execution. The registrations 62 may be provided to the registering means 12 using any system message sending services. Preferably, system message sending services that support transparent interprocess message sending between processes executing on different computers in a network, are used, for example, Msgsnd in the UNIX environment implemented with Remote Procedure Calls. For further information on UNIX system message sending services, see M. J. Bach, *The Design of the UNIX Operating System*, (Prentice Hall, 1986), pp. 361–367, and for Remote Procedure Calls, see *Network Programming Guide*, Sun Microsystems, Part No. 800-3850-10, pp. 33–40.

The resulting message patterns and signaling ways may be stored logically in any well known data structures, for examples, tables or lists. The resulting message patterns and signaling ways may be stored physically in main memory or on any peripheral devices. Preferably, the resulting message patterns and signaling ways are stored as tables 22 in main memory for quick access.

The registering means 12 may also support additional registrations by the registering processes 42, 52, 54 at any points during their execution. Likewise, the registering means 12 may also support deletion of any prior registrations. Upon receipt of a registration 62 requesting deletion of a prior registration, the registering means 12 removes the message patterns or the signaling ways contained in the deletion request from the tables 22. The addition and deletion of any registration may also be supported for addition and deletion of a subset of each registration.

3. REGISTRATIONS

Figure 2:
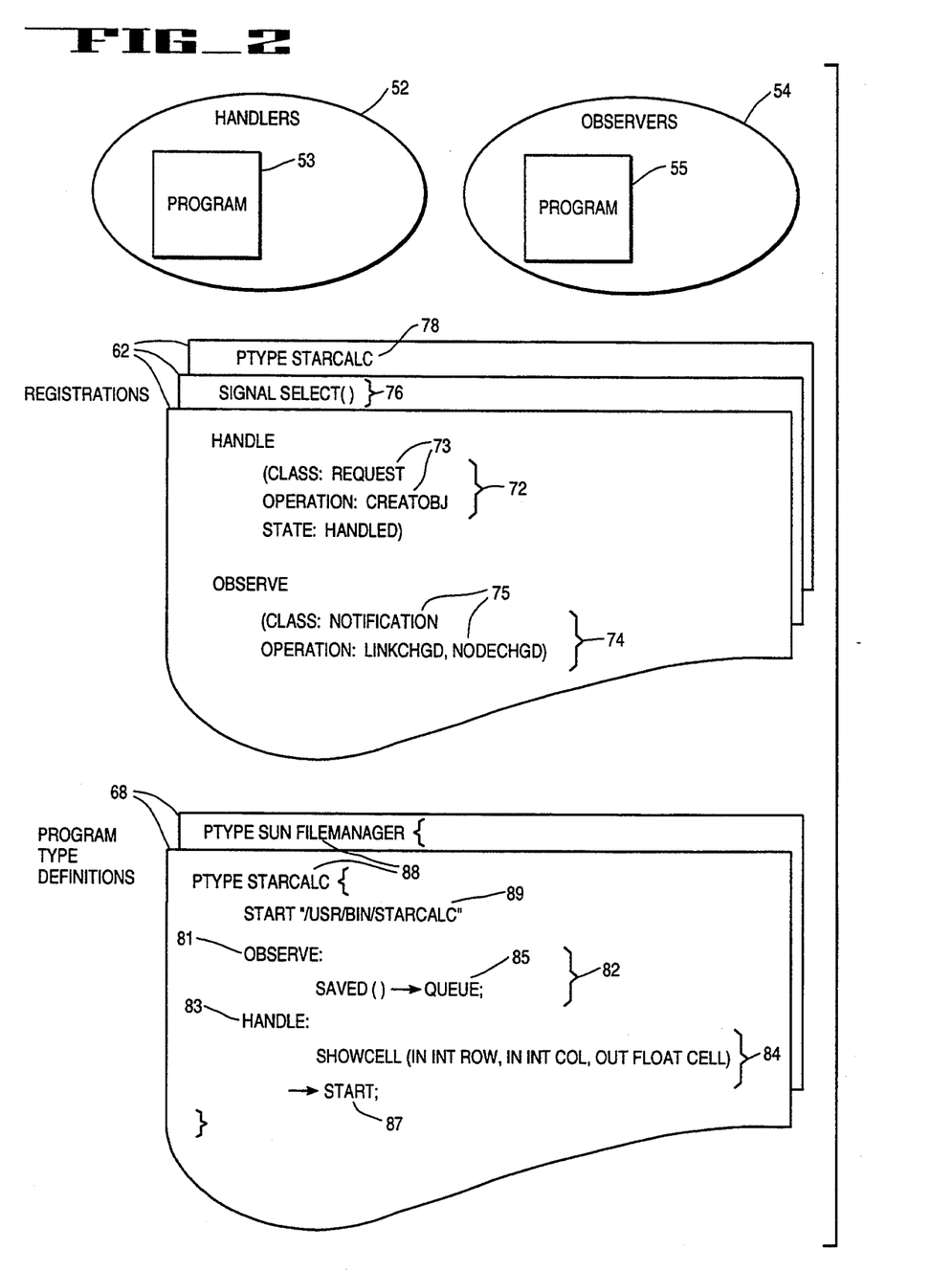
FIG. 2 is a block diagram illustrating exemplary registrations containing exemplary message patterns, signaling way and program type identifier, and exemplary program type definitions containing exemplary program type identifiers, program start up parameters and message signatures, used by the apparatus of the present invention.

Referring now to FIG. 2, a block diagram illustrating the various registrations 62 used by the apparatus of the present invention is shown. As discussed earlier, registration 62 may contain a plurality of message patterns 72, 74, a signaling way 76 or a program type identifier 78. The message patterns 72, 74 are used to describe to the apparatus, the messages which the registering receiver process is to receive. Message patterns 72, 74 comprise handler patterns 72 and observer patterns 74. Each message patterns 72, 74, handler or observer, comprises at least one message attribute 73, 75. Omitted message attributes imply wild cards, i.e. any value for these omitted message attributes are acceptable to the registering receiver process. The message patterns 72, 74 and the message attributes 73, 75 contained therein may be implemented in any syntax. Preferably, the syntax used is friendly to the programmers who develop the programs executed by the receiver processes and convenient for the registering means to parse. The message attributes 73, 75 will be discussed in further details later.

An exemplary registration containing a handle message pattern 72 and an observe message pattern 74 is shown in the first exemplary registration 62 in FIG. 2. The exemplary handle message pattern 72 contains a plurality of message attributes 73 describing to the apparatus that, the registering receiver process is to receive messages with a message class attribute of "Request", and a message operation attribute of "CreateObj", representing the action of creating an object. The exemplary observe message pattern 74 contains a plurality of message attributes 75 describing to the apparatus, that the registering receiver process is to receive messages with a message class attribute of "Notice", and a message operation attribute of "LinkChgd, NodeChgd", representing the occurrence of the events of a link change or a node change.

As discussed earlier, the signaling ways 76 describe to the apparatus of the present invention, how the registering receiver process is to be signaled regarding the availability of a message or how the registering sender process is to be signaled regarding the availability of a reply message. The signaling ways 76 will be discussed in conjunction with the signaling means in further details later. The specification of the signaling ways 76 may be implemented in any syntax. Preferably, the syntax used is consistent or similar to the syntax used for the message patterns 72, 74.

An exemplary registration containing a signaling way is shown in the second exemplary registration 62 in FIG. 2. The exemplary signaling way 76 describes to the apparatus that the registering process is to be signaled with the posting of an event that it can detect using the system service call Select( ).

As discussed earlier, the program type identifier 78 identifies to the apparatus the program type definition 68 of the program being executed by the registering process. The program type identifier 78 is an alternate way for the registering receiver process to register message patterns with the apparatus. The program type definitions 68 describe to the apparatus, the messages which the program is to receive. Through the program type definition 68 identified by the program type identifiers 78, the apparatus generates and registers message patterns for the registering process. The naming convention for the program type identifiers 78 will be discussed in further details later in conjunction with the program type definitions 68. The specification of program type identifiers 78 in registrations 62 may be implemented in any syntax. Preferably, the syntax used is also consistent or similar to the syntax used for the message patterns 72, 74 and the syntax used for the signaling ways 76.

An exemplary registration containing a program type identifier is shown in the third exemplary registration 62 in FIG. 2. The exemplary program type identifier 78 describes to the apparatus that the registering process is executing a program identified by the identifier "starcalc".

4. PROGRAM TYPE DEFINITIONS

Continuing referring to FIG. 2, a block diagram illustrating the program type definitions 68 used by the apparatus of the present invention is also shown. In addition to being an alternate way for the registering process to register message patterns, the program type definitions 68 are also used by the selecting means to select receiver processes. The program type definitions 68 describe to the apparatus, the messages which the individual programs are to receive. Each program type definition 68 comprises a program type identifier 88, a set of program start up parameters 89 and at least one message signature 82, 84. Message signatures 82, 84 comprise observe signatures 82 and handle signatures 84. Each message signature 82, 84 comprises a message pattern 81, 83, and optionally, a message disposition attribute 85, 87.

As discussed earlier, the program type identifiers 88 identify the program type definitions 68. The start up parameters sets 89 describe to the apparatus how to start up processes executing the programs. The message patterns 81, 83 are the same as the message patterns 72, 74 described earlier. The message disposition attributes 85, 87 instruct the apparatus on what actions to take if there are no executing receiver processes executing the program identified by the program type identifier 88. The message disposition attributes 85, 87 will be discussed in conjunction with the message attributes in further details later.

The program type identifiers 88 may be implemented with any naming convention. Preferably, each program type identifier 88 comprise a program supplier identifier and a program identifier, for example, SUN_FileManager. The program start up parameter sets 89, the message signatures 82, 84, and the message patterns 81, 83 and message disposition attributes 85, 87 contained therein, may be implemented in any syntax. Preferably, the syntax used is consistent or similar with the syntax used for the registrations 62.

The program type definitions 68 are stored statically in files ahead of time, by the programmers who develop the programs (see FIG. 1). The program type definitions 68 may be stored using any well known system file services, for examples, Create, Write in the UNIX environment. For further information on system file services in the UNIX environment, see M. J. Bach, *The Design of the UNIX Operating System*, (Prentice Hall, 1986), pp. 91–106. The program type definitions 68 may be stored logically in any file organizations, e.g. sequential or indexed. The program type definitions 68 may be stored physically in any peripheral devices. Preferably, the program type definitions 68 are stored in an indexed file on a direct access storage device to facilitate quick retrieval.

Two exemplary program type definitions 68 are shown in FIG. 2. The first exemplary program type definition 68 is identified by the exemplary program type identifier of "Starcalc" 88, and the second exemplary program type definition 68 is identified by the exemplary program type identifier of "SUN_FileManager" 88. The first exemplary program type definition "Starcalc" 68 comprises a set of program start up parameters 89 and two exemplary message signatures 82, 84. The set of start up parameters "/usr/bin/starcalc" 89 describes to the apparatus, how to start a process executing the program "Starcalc". The first exemplary message signature 82 comprises an observe message pattern 81 and a message disposition attribute of "queue" 85. The second exemplary message signature 84 comprises a handle message pattern 83 and a message disposition attribute of "start" 87.

The message pattern 81 of the first exemplary message signature 82 describes to the apparatus that the program is to receive messages with a message operation attribute of "saved". The message disposition attribute "queue" 85 of the first exemplary message signature 82 describes to the apparatus that, if there is no observer process 54 executing the program "Starcalc", identified by the program type identifier "Starcalc" 88, when a matching message is present, the apparatus is to queue the matching message, pending the registration of such an observer process.

The message pattern 83 of the second exemplary message signature 84 describes to the apparatus that the program is to receive messages with a message operation attribute of "show cell" and a message argument attribute of "in int row, in int col, out float cell" for the message operation attribute. The message disposition attribute "start" 87 of the second exemplary message signature 84 describes to the apparatus that, if there is no handler process 52 executing the program "Starcalc", identified by the program type identifier "Starcalc" 88, when such a matching message is present, the apparatus is to start a process executing the program "Starcalc".

5. SELECTING MEANS

Referring to FIG. 1 again, the selecting means 14 is for selecting the receiver processes 52, 54 to receive messages 64, 65 received by the apparatus as of the present invention 10 from the sender processes 42. Selection comprises selecting at most one handler process 52 and any number of observer processes 54 for each message 64, 65 received from a sender process 42. A handler process 52 is selected for each notice message 65 as well as for each request message 64. Likewise, observer processes 54 are selected for each request message 64 as well as for each notice message 65. Additionally, non-executing receiver processes (i.e. programs) are selected as well as executing receiver processes.

The selecting means 14 comprises an interface (not shown) for receiving messages 64, 65 from the sender processes 42 as input. Each of the messages 64, 65 comprises at least one message attribute. The message attributes describe the messages 64, 65. The selecting means 14 further comprises a first matching means (not shown) coupled to the selecting interface for selecting receiver processes 52, 54 by matching the message attributes in the messages 64, 65 against the message attributes in the message patterns stored in the registration tables 22.

Additionally, the selecting means 14 further comprises a second matching means (not shown) coupled to the first matching means for selecting receiver processes 52, 54 by matching the message attributes in the messages 64, 65 against the message attributes in the message patterns within message signatures contained in the program type definitions 68 stored in the files 24. The selecting means 14 further comprises a third matching means (not shown) coupled to the second matching means for matching the program type identifiers contained in the program type definitions 68 having matching message signatures against program type identifiers of programs being executed by the registered receiver processes 52, 54.

Executing receiver processes 52, 54 having matching registered message patterns are selected. Executing receiver processes 52, 54 executing programs identified by the program type identifiers of the matching program type definitions 68 are also selected. In addition, if there are no executing receiver processes 52, 54 executing the identified programs, and the message disposition attributes of the matching message signatures are either "start" or "queue", the non-executing receiver processes (i.e. programs) identified are also selected.

Additionally, the selecting means 14 further comprises a choosing means (not shown) coupled to the third matching means for selecting one handler process 52, if more than one handler process 52 can handle a message 64, 65. The choosing means ranks the handler processes 52 by the specificity of the matching message attributes and selects the handler process 52 with the highest ranking. If the rankings are tied, the choosing means selects one of the handler processes 52 arbitrarily. For example, for a message 64, 65 with message attributes 'Operation=CreateObj, File=Project', a handler process 52 with a handle message pattern of "Operation=CreateObj, File=Project", being more specific in matching, is ranked higher, and therefore is selected over another handler process 52 with a handle message pattern of "Operation=CreateObj".

Additionally, the selecting means 14 further comprises a starting means coupled to the choosing means for starting selected non-executing receiver processes (i.e. programs). The selected non-executing receiver processes being started are identified by program type identifiers of program type definitions 68 with matching message signatures having message disposition attributes of "Start".

The messages 64, 65 may be provided to the selecting means 14 using any system message sending services. Preferably, the same system message sending services that support transparent interprocess message sending between processes executing on different computers in a network, used for the registering means 12, are used.

6. MESSAGE ATTRIBUTES

Figure 3:
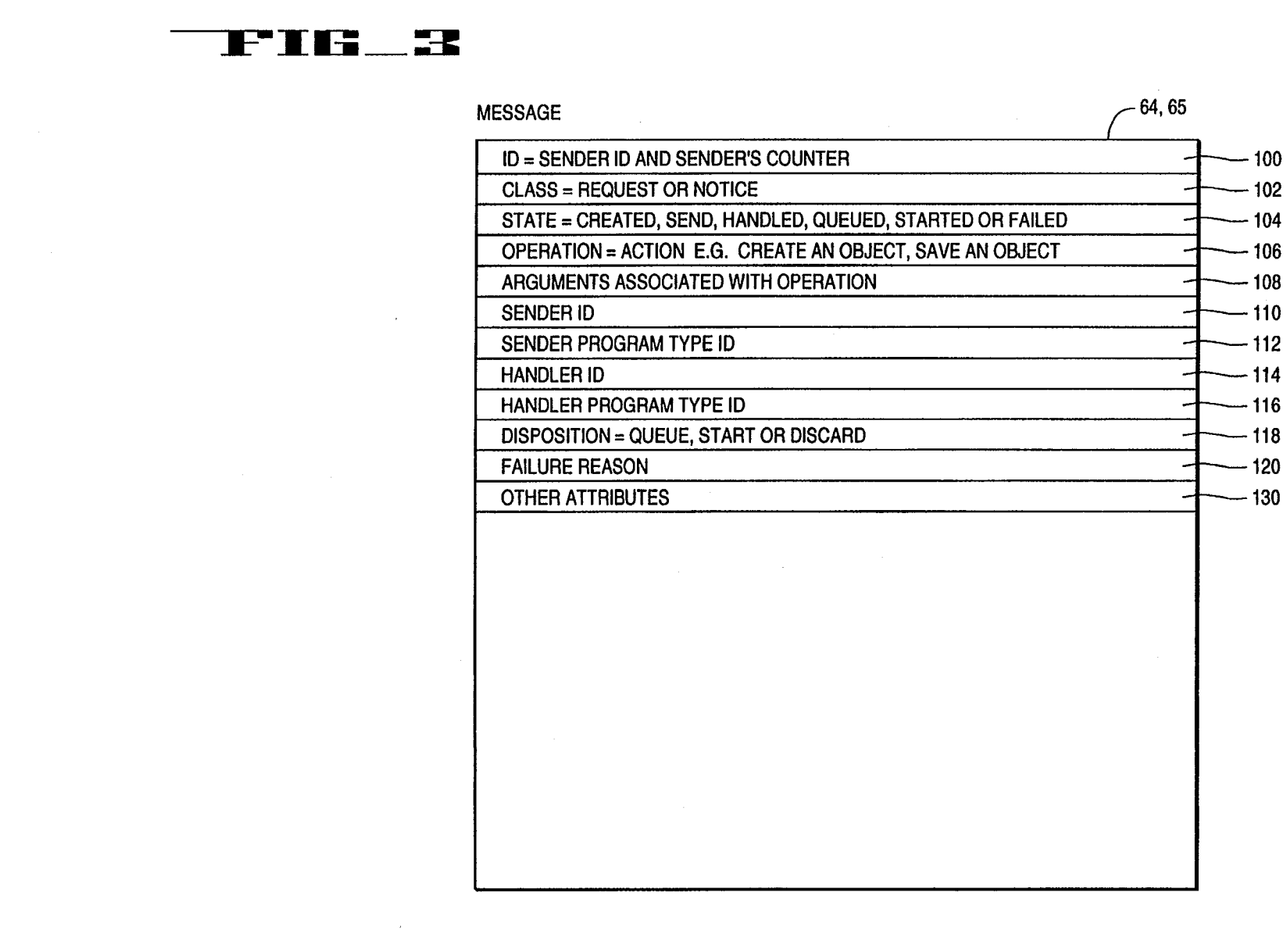
FIG. 3 illustrates exemplary message attributes used by the apparatus of the present invention for describing the messages.

Referring now to FIG. 3, a block diagram illustrating exemplary message attributes used by the apparatus of the present invention for describing the messages is shown. Each message 64, 65 comprises at least one message attribute 100–130. The message attributes 100–130 comprises a message identifier 100 and a plurality of message attributes 102–130. Preferably, the message attributes 102–130 comprise a message class attribute 102, a message state attribute 104, a message operation attribute 106, and a message argument attribute 108. Additionally, the message attributes 110–130 may further comprise a message sender identifier 110, a message sender program type identifier 112, a message handler identifier 114, a message handler program type identifier 116, a message disposition attribute 118, and a message failure reason attribute 120.

The message identifier 100 uniquely identifies the message 64, 65. The unique message identifier 100 may be constructed in a variety of manners. Preferably, the unique message identifier 100 comprises a sender computer identifier, a sender process identifier and a sender process specific message identifier, such as a message counter, for example, Sextant. 712.0001.

The message class attribute 102 describes the message class of the message 64, 65. Preferably, message classes comprises a class of request message and a class of notice message. A message having a request class is a message from a sender process requesting a handler process to act for the requesting sender process. A request message entails reply from the handler process, or from the apparatus, if no handler process is found. A message having a notice class is a message from a sender process announcing that an event has occurred. A notice message does not entail reply from the handler process or the apparatus. A notice message also does not entail returning the message to the sender process, if no handler process is found. The routing and disposition of request and notice messages will be discussed in further details later.

The message state attribute 104 describes the status of the message 64, 65. Preferably, the message states 104 comprise a state of "created", a state of "sent", a state of "handled", a state of "queued", a state of "started" and a state of "failed". The state of "created" indicates that the message 64, 65 has been received by the selecting means from a sender process as input. The state of "sent" indicates that the message 64, 65 has been sent to the selected receiver processes. The state of "handled" indicates that the request message 64, 65 has been handled by a handler process. The state of "queued" indicates that the message 64, 65 has been queued pending the start of a selected receiver process. The state of "started" indicates that a selected receiver process has been started to execute the selected program, and to receive the message 64, 65. The state of "failed" indicates that the requested operation failed and the request message is being returned (as a reply) to the sender process unhandled.

The message operation attribute 106 describes the operation associated with the message 64, 65. The message operations 106 comprise actions requested by the request messages and occurrences announced by the notice messages. The actions requested comprise, for examples, the creation of an object for the requesting process or the saving of an object for the requesting process. The occurrences announced comprise, for examples, "link changed", "node changed", "object created" and "object saved". The message argument attribute 108 describes the arguments associated with the message operation. The message arguments comprise, for examples, parameters to be used with the creation of an object or parameters to be used with the saving of an object.

The sender process identifier 110 and the handler process identifier 114 uniquely identify the sender process and the handler process. The sender and handler process identifiers 110, 114 may be constructed in a variety of manners. Preferably, the sender and handler process identifiers 110, 114 comprise a host computer name and a process identifier, for example, Strawdog. 1322. As discussed earlier, the sender process program type identifier 112 and the handler process program type identifier 116 identify the program types of the programs being executed by the sender process and the handler process. The sender and handler program type identifiers 112, 116 may also be constructed in a variety of manners. Preferably, the program type identifiers 112, 116 comprise a program supplier identifier and a program name, for example, SUN_FileManager.

The message disposition attribute 118 describes the disposition of the message 64, 65, in the event that no executing registered process is executing a program which is to receive the message 64, 65 (i.e. message signatures matched). Preferably, the message dispositions 118 comprise a disposition of 'queued', a disposition of 'started', and a defaulted disposition of 'discard' if no disposition is specified. The disposition 'queued' describes to the apparatus of the present invention that the message 64, 65 is to be queued pending the start of a receiver process executing the program identified by the matching program type definition. The disposition 'start' describes to the apparatus that a receiver process is to be started executing the program identified by the matching program type definition. The defaulted disposition 'discard' describes to the apparatus that the message is to be discarded.

7. QUEUING MEANS

Referring to FIG. 1 again, the queuing means 16 is for queuing copies of the messages 64, 65 with selected receiver processes 52, 54. The queuing means 16 being coupled to the selecting means 14 queues copies of the messages 64, 65 with executing selected receiver processes 52, 54 for subsequent retrieval by these processes. The queuing means 16 also queues copies of the messages 64, 65 with non-executing selected receiver processes (i.e. programs), if the message disposition attributes are "queue".

Copies of the messages 64, 65 may be queued logically in any data structures and stored physically in any peripheral devices. Preferably, the queues 26 comprise a plurality of undelivered messages queues for executing processes, organized as lists, on a per process basis, and a plurality of undelivered messages queues for non-executing processes, also organized as lists, on a per process basis. Additionally, the queues 26 for executing processes are stored physically in memory for quick retrieval, and the queues 26 for non-executing processes are stored physically on direct access storage devices.

8. SIGNALING MEANS

Continuing referring to FIG. 1, the signaling means 20 is for signaling the selected receiver processes 52, 54 regarding the availability of a message 64, 65. The signaling means 20 signals the executing receiver processes 52, 54 when the receiver processes 52, 54 are selected and copies of the messages 64, 65 are queued. The signaling means 20 signals the pending receiver processes when the pending receiver processes 52, 54 with matching program types register their program type identifiers with the apparatus, typically at the initialization of the receiver processes 52, 54. It will be understood that receiver processes 52, 54 being started by the apparatus 10 do not have to be signaled. The starting receiver processes 52, 54 are "signaled" as part of the start up process.

The signaling means 20 being coupled to the registering means 12 and the queuing means 16, looks up the registered signaling ways stored in the registration tables 22 and signals the receiver processes 52, 54, accordingly. As discussed earlier, the signaling ways may be any of the well known event posting techniques supported by system event detection services. Preferably, system event detection services that support events detection different computers in a network, are used, for example, polling the presence of data with the Select ( ) system call in the UNIX environment implemented with Remote Procedure Calls. For further information on Select( ) system call in the UNIX environment, also see M. J. Bach, *The Design of the UNIX Operating System*, (Prentice Hall, 1986), pp. 342, 388.

Upon receipt of the signals, the signaled receiver processes 52, 54 may retrieve the queued copies of the messages 64, 65 from the apparatus of the present invention 10, at any subsequent points during their execution of their choosing.

9. DELIVERING MEANS

Continuing referring to FIG. 1, the delivering means 21 is for dequeuing the queued messages 64, 65 and delivering the messages 64, 65 to the selected receiver processes 52, 54. The delivering means 21 comprises an interface (not shown) for receiving acknowledgements from the receiver processes 52, 54 as inputs, indicating that the receiver processes 52, 54 are ready to receive the queued messages 64, 65. Upon receipt of the acknowledgments, the delivering means 21 dequeues the queued messages 64, 65 and delivers the messages 64, 65 to the acknowledging receiver processes 52, 54.

The acknowledgements may be provided to the delivering means 21 using any system message sending services. Likewise, the queued copies of the messages 64, 65 may be delivered using any system message sending services. Preferably, the same system message sending services that support transparent interprocess message sending between processes executing on different computers in a network, used for the registering means 12, and the selecting means 14 are used.

10. REPLIES

Continuing referring to FIG. 1, the apparatus for interprocess message switching of the present invention 10 also provides specific support for providing reply messages 67 to the request messages 64. Reply messages 67 are generated by updating request messages 64 with results of the requests. No reply messages 67 are generated for notice messages 65. The apparatus 10 provides additional specific support in the queuing means 16 and an additional updating means 18. The registering means 12, the selecting means 14, the signaling means 20, and the delivering means 21 are also used to support the reply messages 67, but no additional supports are required in these means. It will be understood that separate registering means 12, selecting means 14, queuing means 16, signaling means 20, and delivering means 21 may be used.

In addition to the functions described above, the registering means 12 is also used for registering the sender process 42. Registration of sender process comprises registering at least one signaling way for the sender process 42. Similarly, the signaling ways describe to the apparatus 10, how the registering sender process 42 is to be signaled regarding the availability of a reply message 67. The registration is accomplished in the same manner, using the same means, as previously described for registering receiver processes 52, 54.

The updating means 18 is used for generating the reply messages 67 by updating the request messages 64 with results of the requests. The updating means 18 being coupled to the selecting means 14 updates the message state attributes of request messages to "Failed", when handler processes are not found by the selecting means 14.

In addition to the functions described above, the queuing means 16 is also used for discarding notice messages 65 with no selected receiver processes 52, 54, and queuing additional copies of the request messages 64 with selected handler processes 52. The queuing means 16 queues copies of the request messages 64 with selected handler processes into at least one result pending message queue. Again, the reply pending request messages 64, may be queued logically in any well known data structures and stored physically in any peripheral devices. Preferably, the result pending queues are also organized as lists, on a per process basis. Additionally, the result pending queues are also stored in memory for quick access.

Additionally, the updating means 18 further comprises an interface (not shown) for receiving results 66 from handler processes 52 as inputs. Each result comprises updates to the message attributes in a result pending request message. Upon receipt of the results 66, the updating means 18 dequeues the results pending request messages from the result pending queues, and updates the message state attributes in the result pending request messages to "Handled" or "Failed", according to the results 66. The updating means 18 also updates other message attributes, e.g. message failure reason attributes, in the result pending request messages, according to the received results 66.

The results 66 may be provided to the updating means 18 using any system message sending services. Preferably, the same system message sending services that support transparent interprocess message sending between processes executing on different computers in a network, used for the other means 12, 14, 21 are used.

Similarly, the selecting means 14 is also used for selecting any number of observer processes 54 to receive the reply messages 67. Non-executing observer processes are selected as well as executing observer processes. The selecting means 14 being coupled to the updating means 18, receives the reply messages 67 through the same interface for receiving messages 64, 65 from the sender processes 42. The selecting means 14 uses its matching means to select the executing and non-executing observer processes, in the same manner as discussed above.

Likewise, the queuing means 16 is also used for queuing copies of the reply messages 67 for the original sender processes 42 and any selected observer processes 54. The queuing means 16 being coupled to the selecting means 14, queues copies of the reply messages 67 into the same undelivered messages queues, in the same manner as discussed above.

Similarly, the signaling means 20 is also for signaling the original sender processes 42, and the selected executing observer processes 54 regarding the availability of the reply messages 67. The signaling means 20, signals the original sender processes 42 and the selected executing and non-executing observer processes 54, in the same manner as discussed above.

Again, upon receipt of the signals, the signaled sender processes 42 and observer processes 54 may retrieve the queued copies of the reply messages 67 from the apparatus of the present invention 10, at any subsequent points during their execution of their choosing. The delivering means 21 is also used for dequeuing and delivering the reply messages 67. The queued copies of the reply messages 67 may be retrieved in the same manner as discussed earlier.

While the apparatus for interprocess message switching of the present invention 10 provides specific support for the reply messages 67, it will be understood that the support, though preferred, is optional. Particularly, the reply messages 67 from the selected handler processes 52, may be effectuated by placing the burden of establishing return communication on the participating processes 42, 52, 54. The sender processes 42 may register themselves as "observer processes" with the appropriate message attributes, and the handler processes 52 may "originate" the reply message 67 as new "notice messages" having corresponding message attributes, as if the handler processes 52 are "sender processes". By matching the message attributes, the apparatus 10 will be able to "select" the original sender process 42 and signal the original sender process 42 regarding the availability of the "reply messages".

11. REQUEST AND NOTICE ROUTING

Figure 4:
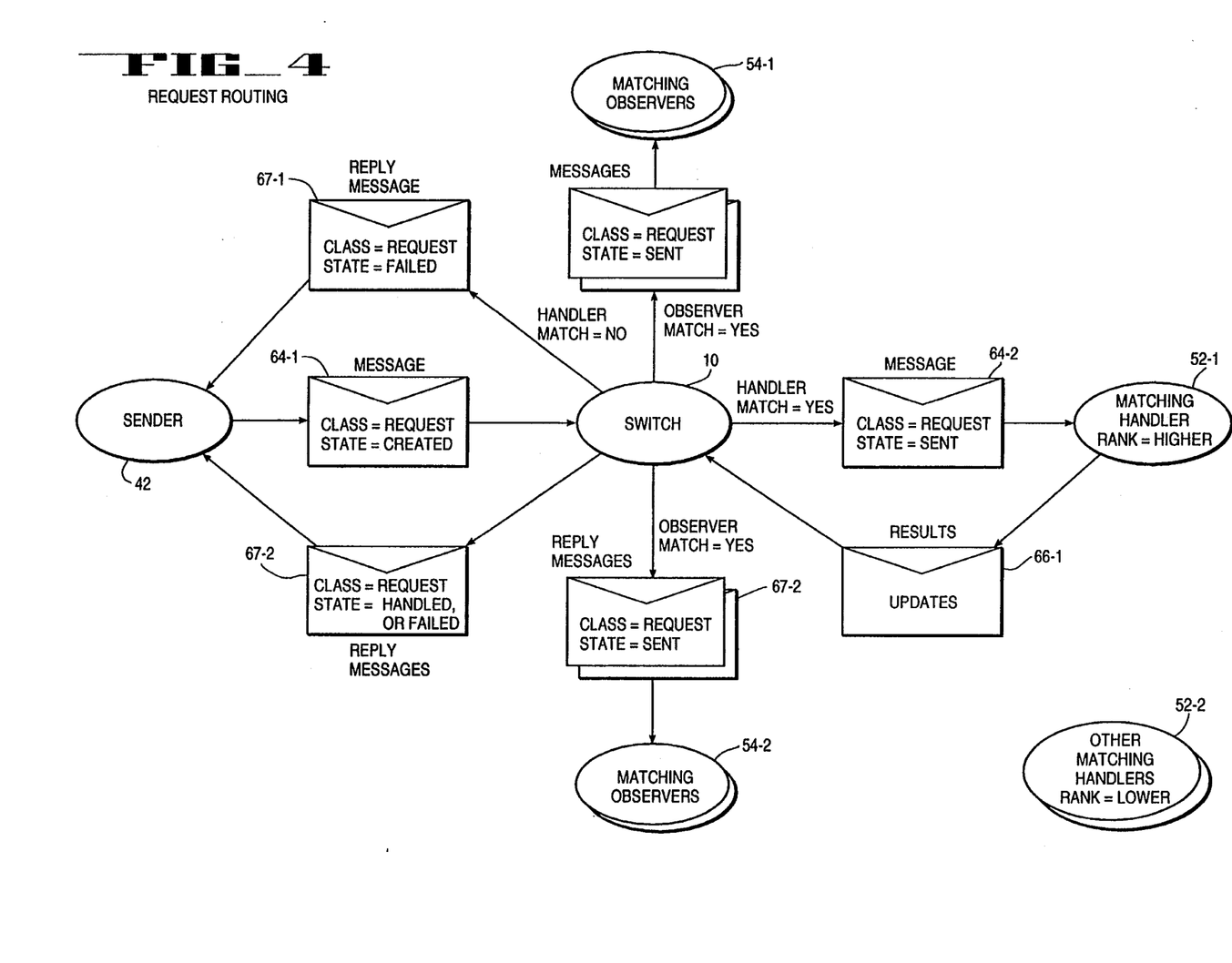
FIG. 4 illustrates the routing of a request message in the preferred embodiment of the present invention.

Referring now to FIG. 4, a block diagram summarizing the routing and disposition of a request message is shown. The request messages 64-1, 64-2 and the reply messages 67-1, 67-2, relate to the request messages 64 and the reply messages 67 of FIG. 1. Likewise, the handler processes 52-1, 52-2 and the observer processes 54-1, 54-2 relate to the handler processes 52 and the observer processes 54 of FIG. 1.

Initially, the request message with a message state attribute of "created" 64-1 is sent to the apparatus for interprocess message switching of the present invention 10 as input, as discussed earlier. Copies of the request message with the message state attribute changed to "sent" 64-2 are eventually routed to all selected registered observer processes 54-1. However, only one copy of the request message with the message state attribute changed to "sent" 64-2 is eventually routed to one selected registered handler process 52-1 with the highest ranking. No copy of the request message 64-2 is routed to the other eligible handler processes with lower rankings 52-2.

If no handler process registered is selected, the apparatus 10 updates the message state attribute of the request message to "failed" and generates a reply message 67-1. The reply message 67-1 is eventually routed back to the originating registered sender process 42.

After the request message is handled, the result 66 is sent from the handler process 52-1 to the apparatus 10 as input. The apparatus updates the message state attribute of the request message to "handled" or "failed" according to the results received and generates a reply message 67-2. Copies of the reply message 67-2 are eventually routed to all selected registered observer processes 54-2, as well as the originating registered sender process 42.

Figure 5:
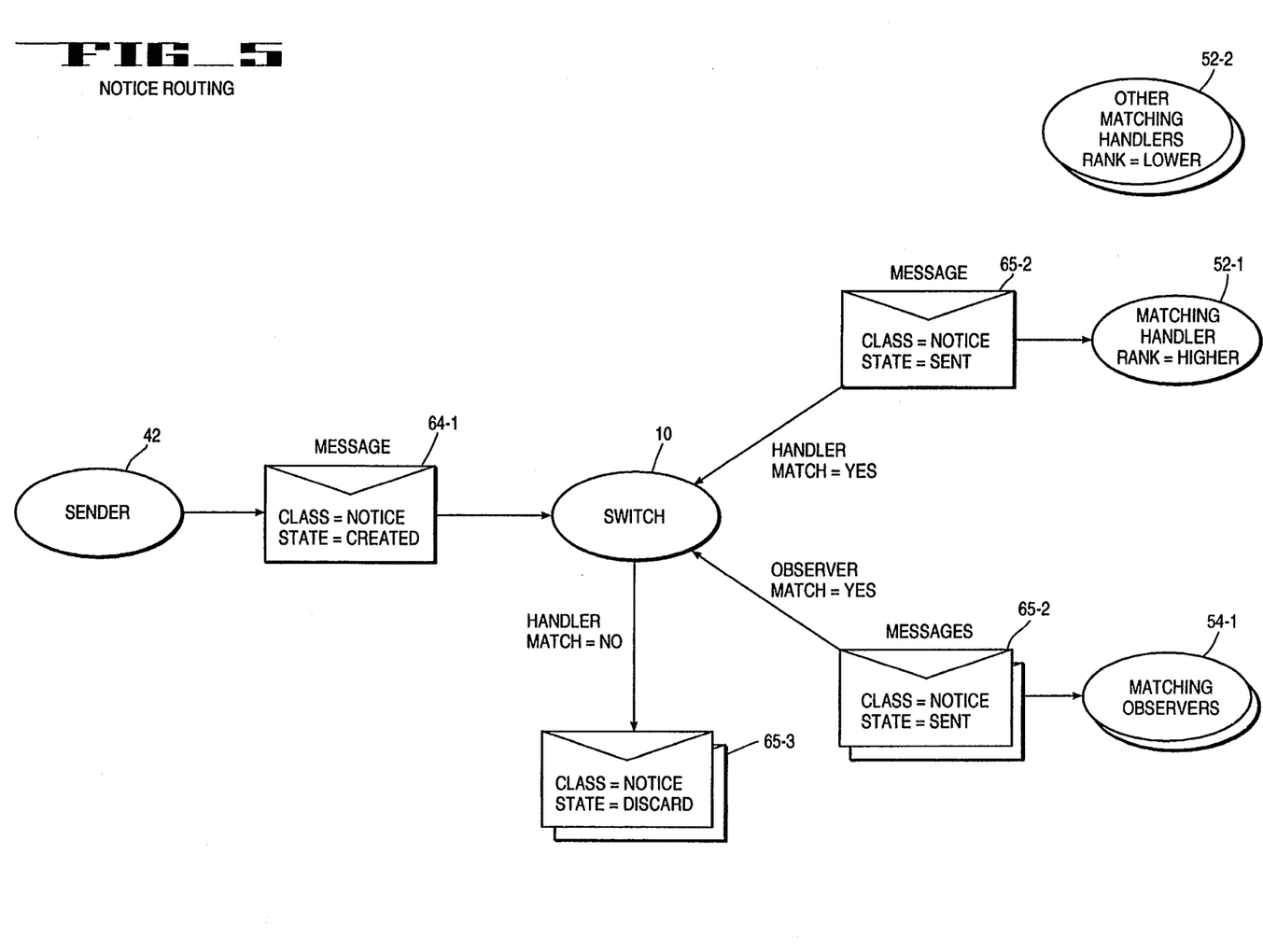
FIG. 5 illustrates the routing of a notice message in the preferred embodiment of the present invention.

FIG. 5 shows a block diagram summarizing the routing and disposition of a notice message is shown. Like FIG. 4, the notice messages 65-1, 65-2, 65-3 and the handler processes 52-1, 52-2 relate to the notice messages 65, and the handler processes 52 in FIG. 1.

Initially, similar to a request message, the notice message with a message state attribute of "created" 65-1 is sent to the apparatus for interprocess message switching of the present invention 10 as discussed earlier. Similarly, copies of the notice message with the message state attribute changed to "sent" 65-2 are eventually routed to all selected registered observer processes 54-1. Likewise, only one copy of the notice message with the message state attribute changed to "sent" 65-2 is also eventually routed to one selected registered handler process 52-1. No copy of the notice message 65-2 is routed to the other eligible handler processes with lower rankings 52-2.

Unlike a request message, if neither handler process 52-1, 52-2 nor observer processes 54 are selected, the notice message 65-3 is discarded. Also unlike a request message, the selected handler process 52-1 does not generate a reply to a notice message after handling the notice message 65-2.

12. OPERATIONAL STATES

Referring now to FIG. 6, an exemplary state diagram illustrating possible operations of one approach to the operation of the apparatus for interprocess message switching of the present invention is shown. The apparatus is a wait state 140 until it receives input. There are five basic types of input and associated processing, represented by the five different loops 150, 160, 170, 180, 190. The input is either a registration of message patterns 152, a registration of signaling ways 162, a registration of program type 172, a message from a sender process 182, or a reply from a handler process 192.

If a registration of message patterns is received 152, the registration is processed, the message patterns contained therein are stored into the registration tables 156. After the message patterns are stored, the apparatus returns to the wait for input state 140.

Similarly, if a registration of signaling ways is received 162, the registration is processed, the signaling ways contained therein are extracted 164 and the extracted signaling ways are stored into the registration tables 166. After the signaling ways are stored, the apparatus returns to the wait for input state 140.

Likewise, if a registration of program type identifier is received 172, the registration is processed, the program type identifier contained therein is extracted, message patterns are generated using the program type definition identified by the program type identifier 174, and the generated message patterns are stored into the registration tables 176, the program pending queues are checked for available messages 178 and the registering process is signaled if messages are available 179. After the program pending queues are checked and the registering process is signaled, if applicable, the apparatus returns to the wait for input state 140.

If a message is received 182, one handler process and any number of observer processes are selected 184. If processes are selected, copies of the message is queued for subsequent retrieval by the selected processes 186. If the message is a request message, an additional copy is queued in the reply pending messages queue 186. If no process is selected, the message is either queued for return to the original sender or discarded, depending on whether it is a request message or a notice message 186. After copies of the message are queued, the selected processes, including the original sender process if applicable, are signaled regarding the availability of the queued messages 188. After the processes are signaled, the apparatus returns to the wait for input state 140.

If a result to a request message is received 192, the request message is dequeued from the reply pending messages queue and updated with the reply 194, creating a reply message. Then, any number of observer processes are selected 196. Copies of the reply message are queued for subsequent retrieval by the original sender process and the selected observer process 197. After copies of the reply message are queued, the original sender process and the selected observer processes are signaled regarding the availability of the reply message 198. After the processes are signaled, the apparatus returns to the wait for input state 140.

13. VARIATIONS

While the apparatus for interprocess message switching of the present invention has been described in terms of a preferred embodiment, it will be understood that the present invention is not limited to the request and notice messages nor the handler and observer processes discussed herein. The present invention is also not limited to processes executing on different computers communicating across a network. Those skilled in the art will recognize that the invention can be practiced with modification and alteration within the spirit and scope of the appended claims to serve a wide variety of interprocess communication situations for processes being executed by the same computer and for processes being executed by different computers in a network.

What is claimed is:

1. A method for interprocess message routing in a computer system, said computer system comprising a sender process and a plurality of receiver processes, said plurality of receiver processes comprising handler processes and observer processes, said method comprising the steps of:

registering each of said receiver processes with a routing apparatus in said computer system that performs interprocess message routing such that said receiver processes become registered receiver processes, said step of registering comprising registering a signaling way for each receiver process, said signaling way describing how said receiver process is to be signaled, registering at least one message pattern for each of said receiver processes, said message patterns describing at least one message which said registering receiver process is to receive;

sending at least one message from said sender process to said routing apparatus, said message sent by said sender process comprises at least one message attribute, one of said message attributes comprising a message class of "Request" or a message class of "Notice", message having a message class of "Request" requiring a reply, a message having a message class of "Notice" not requiring a reply;

selecting a set of said registered receiver processes to receive said message from said routing apparatus by matching said message against said message patterns registered by said receiver processes, said step of selecting a set of said registered receiver processes comprises said routing apparatus selecting at most one handler process to handle said received message and any number of observer processes;

queuing, in said routing apparatus, copies of said message with said set of receiver processes;

signaling said set of registered receiver processes from said routing apparatus regarding the availability of said queued copies of said message, said step of signaling performed by said routing apparatus using said signaling way given by said selected registered receiver process; and sending said queued copies of said message from said routing apparatus to each of said set of registered receiver processes upon request of each of said set of registered receiver processes.

2. The method for interprocess message routing in a computer system as set forth in claim 1, wherein said step of registering at least one message pattern for each of said receiver processes comprises registering a plurality of message attributes describing messages which said registering receiver process are to receive.

3. The method for interprocess message routing in a computer system as set forth in claim 1, wherein said step of registering at least one message pattern for each of said receiver processes further comprises registering a program type identifier for each of said receiver processes, said program type identifiers identifying programs being executed by said registering receiver processes, said routing apparatus generating and registering said message patterns for each of said registering receiver processes using message signatures contained within a program type definition comprising matching program type identifiers, said program type definitions being stored in a file coupled to said routing apparatus.

4. The method for interprocess message routing in a computer system as set forth in claim 3, wherein each of said stored program type definitions further comprises a set of program start up parameters and at least one message signature, each of said message signatures comprising one of said message pattern and a message disposition attribute.

5. The method for interprocess message routing in a computer system as set forth in claim 4, wherein said step of registering said receiver processes further comprises deregistering a receiver process when said receiver process requests a deregistration.

6. The method for interprocess message routing in a computer system as claimed in claim 2, wherein said message attributes in said message comprises a message identifier for said received message, said message identifier comprising a sender computer identifier, a sender process identifier, and a sender process specific message identifier.

7. The method for interprocess message routing in a computer system as claimed in claim 1, wherein said message attributes in said message further comprise a message state attribute, each of said message states being one of a plurality of message states comprising a state of "Created", a state of "Sent", a state of "Handled", a state of "Started", a state of "Failed" and a state of "Queued".

8. The method for interprocess message routing in a computer system as claimed in claim 1, wherein said message attributes in said message further comprise a program type identifier for said sender process.

9. The method for interprocess message routing in a computer system as claimed in claim 1, wherein said message attributes in said message further comprise a program type identifier for a handler process.

10. The method for interprocess message routing in a computer system as claimed in claim 1, wherein said message attributes in said message further comprise a message disposition attribute, each of said message dispositions being one of a plurality of message dispositions comprising a disposition of "Queue", a disposition of "Start", and a disposition of "Discard", said disposition of "Discard" being the defaulted disposition if no disposition is specified.

11. The method for interprocess message routing in a computer system as set forth in claim 1, wherein said selecting of at most one handler process and any number of observer processes comprises selecting non-executing as well as executing handler and observer processes.

12. The method for interprocess message routing in a computer system as set forth in claim 1, wherein said step of selecting said registered receiver processes further comprises the steps of, matching said message attributes in said message sent by said sender process against said message attributes in said message patterns contained in message signatures, said message signatures being contained in program type definitions, said program type definitions being stored in files coupled to said routing apparatus; and matching program type identifiers contained in said stored program type definitions having said matching message attributes, by said routing apparatus, against program type identifiers of programs being executed by said registered receiver processes.

13. The method for interprocess message routing in a computer system as set forth in claim 12, wherein said step of selecting said registered receiver processes further comprises the step of choosing one handler process by said routing apparatus, said one handler process being chosen by ranking said matching message attributes of said matching message patterns and said matching message signatures, said one handler process further being chosen arbitrarily, if said rankings of said matching message attributes are tied.

14. The method for interprocess message routing in a computer system as set forth in claim 1, wherein said step of queuing copies of said message with selected receiver processes comprises queuing copies of said message into at least one undelivered messages queue, by said routing apparatus, for subsequent retrieval by said selected receiver processes.

15. The method for interprocess message routing in a computer system as claimed in claim 14, wherein said step of queuing copies of said message with selected receiver processes further comprises queuing copies of said message with selected receiver processes into at least one program pending messages queue by said routing apparatus, for subsequent retrieval by said selected receiver processes, said message with selected receiver processes having copies queued into said program pending messages queues comprise said message comprising message attributes matching against message signatures, said matching message signatures further comprising message disposition attributes equaling "Queue", and being contained in program type definitions identifying programs not being executed by said registered receiver processes.

16. The method for interprocess message routing in a computer system as claimed in claim 1, wherein said step of sending said queued messages comprises dequeuing said queued messages from messages queues and sending said dequeued messages by said routing apparatus to said selected receiver processes using a system message sending services.

17. The method for interprocess message routing in a computer system as claimed in claim 1, wherein said method further comprises the step of discarding said message with message class attributes equaling "Notice" and no selected receiver processes, said received "Notice" messages with no selected receiver processes comprise said received "Notice" messages having message attributes non-matching against registered message patterns and non-matching against message signatures contained in program type definitions, said program type definitions being stored in files couples to said routing apparatus.

18. The method for interprocess message routing in a computer system as claimed in claim 17, wherein said received "Notice" messages with no selected receiver processes further comprise said received "Notice" messages having said message attributes matching against said message signatures, said matching message signatures further comprising message dispositions equaling "Discard", and being contained in said program types identifying programs not being executed by said registered receiver processes.

19. The method for interprocess message routing in a computer system as claimed in claim 1, wherein said method further comprises the steps of registering said sender process with said routing apparatus; and replying from said handler process to said sender process when said message has a message class attributes equaling "Request".

20. The method for interprocess message routing in a computer system as claimed in claim 19, wherein said step of registering said sender process comprises registering a signaling way for said sender process, said signaling way describing how said registering sender process is to be signaled regarding the availability of a queued reply message.

21. The method for interprocess message routing in a computer system as set forth in claim 19, wherein said step of replying to said sender process comprises replying to a "Request" message with no selected handler process, said "Request" message with no selected handler process comprise said received "Request" message having message attributes non-matching against registered message patterns and non-matching against message signatures contained in program type definitions, said program type definitions being stored in files coupled to said routing apparatus.

22. The method for interprocess message routing in a computer system as claimed in claim 21, wherein said "Request" message with no selected handler process further comprise said "Request" message having said message attributes matching against said message signatures, said matching message signatures further comprising message dispositions equaling "Discard", and being contained in said program types identifying programs not being executed by said registered receiver processes.

23. The method for interprocess message routing in a computer system as claimed in claim 19, wherein said step of replying from said handler process to said sender process comprises the steps of, generating a reply message for each said "Request" message;

selecting said registered receiver processes to receive said reply messages;

queuing said reply messages to at least one undelivered messages queue, for subsequent retrieval by said sender process and said selected receiver processes;

signaling said sender process and said selected receiver processes regarding the availability of said queued reply messages; and sending said queued reply messages to said signaled receiver processes upon request.

24. The method for interprocess message routing in a computer system as set forth in claim 23, wherein said step of generating reply messages comprises updating message attributes of it "Request" messages with no selected handler process by said routing apparatus, said message attributes being updated comprising message state attributes being updated to "Failed".

25. The method for interprocess message routing in a computer system as set forth in claim 24, wherein said step of generating reply messages further comprises updating message attributes of said "Request" messages with selected handler process by said routing apparatus, said message attributes being updated according to results received from said handler processes, said message attributes being updated comprising message state attributes being updated to one of a plurality of message states comprising a state of "Handled" and a state of "Failed".

26. The method for interprocess message routing in a computer system as set forth in claim 25, wherein said step of generating reply messages further comprises the steps of, queuing another copy of each of said "Request" messages with selected handler processes, pending receipt of said results from said handler processes; and dequeuing said results pending "Request" messages upon receipt of said results from said handler processes for said step of updating.

27. The method for interprocess message routing in a computer system as set forth in claim 26, wherein said step of queuing copies of said "Request" messages comprises queuing said copies in at least one result pending messages queue by said routing apparatus.

28. An apparatus for message routing between a sender process and a plurality of receiver processes, said plurality of receiver processes comprising handler processes and observer processes, said apparatus comprising:
- a first registering means for registering said receiver processes with said apparatus, said first registering means comprising a first interface for receiving registrations, said first registering means registering a signaling way describing how said receiver process is to be signaled and at least one message pattern for each of said receiver processes, said message pattern describing at least one message which said registering receiver process is to receive;
- receiving means, said receiving means comprising a second interface for receiving at least one message sent by said sender process, said message comprising at least one message attribute, one of said message attributes in some of said received messages comprising a message class attribute, said message class attribute comprising a message class of "Request" or a message class of "Notice", a message having a message class "Request" requiring a reply, a message having a message class "Notice" not requiring a reply;
- first selecting means for selecting a set of said registered receiver processes to receive said message sent by said sender process, said first selecting means comprising a first matching means, said first matching means selecting a set of said registered receiver processes to receive said message sent by said sender process by matching said message against said first set of message attributes in said message patterns registered by said receiver processes, said set of said registered receiver processes comprising at most one handler process to handle said message and any number of observer processes;
- first queuing means coupled to said first selecting means, for queuing said message with said set of receiver processes;
- first signaling means coupled to said first queuing means and said first registering means, for signaling said set of receiver processes regarding availability of said queued messages, said first signaling means using said signaling way given by said set of registered receiver process; and
- first delivering means for delivering said queued messages to each of said set of said selected registered receiver processes which request delivery of said message, said first delivering means comprising a third interface for receiving said delivery request.

29. The apparatus for message routing between a sender process and a plurality of processes as set forth in claim 28, wherein said first registering means for registering said receiver processes further comprises a first processing means coupled to said first interface for processing one of said received registrations comprising a program type identifier, said program type identifier identifying programs being executed by said registering receiver processes, said first processing means generating and registering said message patterns for said registering receiver processes, using message signatures contained within program type definitions comprising matching program type identifiers, and storing said generated message patterns into said tables, said program type definitions being stored in files accessible to said first processing means.

30. The apparatus for message routing between a sender process and a plurality of processes as set forth in claim 29, wherein each of said stored program type definitions further comprises a set of start up parameters and at least one message signature, each of said message signatures comprising a message pattern and a message disposition attribute.

31. The apparatus for interprocess message routing between a sender process and a plurality of receiver processes as set forth in claim 28, wherein said message attributes in each of said received messages comprise an identifier for said received message, each of said message identifier comprising a sender computer identifier, a sender process identifier and a sender process specific message identifier.

32. The apparatus for interprocess message routing between a sender process and a plurality of receiver processes as set forth in claim 28, wherein said message attributes in some of said received messages further comprise a message state attribute, each of said message states being one of a plurality of message states comprising a state of "Created", a state of "Sent", a state of "Handled", a state of "Started", a state of "Failed" and a state of "Queued".

33. The apparatus for interprocess message routing between a sender process and a plurality of receiver processes as set forth in claim 28, wherein said message attributes in some of said received messages further comprise a message operation attribute and a message argument attribute.

34. The apparatus for interprocess message routing between a sender process and a plurality of receiver processes as set forth in claim 28, wherein said message attributes in some of said received messages further comprise a program type identifier for said sender process.

35. The apparatus for interprocess message routing between a sender process and a plurality of receiver processes as set forth in claim 28, wherein said message attributes in some of said received messages further comprise a program type identifier for said handler process.

36. The apparatus for interprocess message routing between a sender process and a plurality of receiver processes as set forth in claim 28, wherein said message attributes in some of said received messages further comprise a message disposition attribute, each of said message dispositions being one of a plurality of message dispositions comprising a disposition of "Queue", a disposition of "Start", and a disposition of "Discard", said disposition of "Discard" being the defaulted disposition if no disposition is specified.

37. The apparatus for interprocess message routing between a sender process and a plurality of receiver processes as set forth in claim 28, wherein said first selecting means for selecting said registered receiver processes selects at most one handler process and any number of observer processes.

38. The apparatus for interprocess message routing between a sender process and a plurality of receiver processes as set forth in claim 37, wherein said selecting of at most one handler process and any number of observer processes comprises selecting non-executing as well as executing handler and observer processes.

39. The apparatus for interprocess message routing between a sender process and a plurality of receiver processes as set forth in claim 28, wherein said first selecting means for selecting said registered receiver processes further comprises,     second matching means coupled to said first matching means for matching said message attributes in said received messages, against said message attributes in said message patterns contained in message signatures, said message signatures being contained in program type definitions, said program type definitions being stored in files accessible to said second matching means; and     third matching means coupled to said second matching means for matching program type identifiers contained in said stored program type definitions having said matching message attributes, against program type identifiers of programs being executed by said registered receiver processes, said program type identifiers of programs being stored in said tables and accessible to said third matching means.

40. The apparatus for interprocess message routing between a sender process and a plurality of receiver processes as set forth in claim 39, wherein said first selecting means for selecting said registered receiver processes further comprises a choosing means coupled to said third matching means for choosing one handler process, said one handler process being chosen by ranking said matching message attributes of said matching message patterns and said matching message signatures, said one handler process further being chosen arbitrarily, if said rankings of said matching message attributes are tied.

41. The apparatus for interprocess message routing between a sender process and a plurality of receiver processes as set forth in claim 40, wherein said first selecting means for selecting said registered receiver processes further comprises a starting means coupled to said choosing means for starting said selected receiver processes, said receiver processes being started comprise said receiver processes executing said programs identified by said stored program type definitions with said matching message signatures, said programs not being executed by other registered receiver processes, and said matching message signatures comprising message disposition attributes of "Start".

42. The apparatus for interprocess message routing between a sender process and a plurality of receiver processes as set forth in claim 28, wherein said first queuing means for queuing copies of said received messages with selected receiver processes queues copies of said received messages into at least one process pending messages queue, for subsequent retrieval by said selected receiver processes,     said received messages with selected receiver processes having copies queued into said program pending messages queues comprise said received messages comprising message attributes matching against message signatures, said matching message signatures further comprising message disposition attributes equaling "Queue", and being contained in program type definitions identifying programs not being executed by said registered receiver processes.

43. The apparatus for interprocess message routing between a sender process and a plurality of receiver processes as set forth in claim 28, wherein said first delivering means for delivering said queued messages for said selected receiver processes dequeues said queued messages from messages queues and sends said dequeued messages to said selected receiver processes, using system message sending services.

44. The apparatus for interprocess message routing between a sender process and a plurality of receiver processes as set forth in claim 28, wherein said first queuing means further discards said received messages with message class attributes equaling "Notice" and no selected receiver processes, said received "Notice" messages with no selected receiver processes comprise said received "Notice" messages having message attributes non-matching against registered message patterns and non-matching against message signatures contained in program type definitions.

45. The apparatus for interprocess message routing between a sender process and a plurality of receiver processes as set forth in claim 44, wherein said received "Notice" messages with no selected receiver processes further comprise said received "Notice" messages having said message attributes matching against said message signatures, said matching message signatures further comprising message dispositions equaling "Discard", and being contained in said program types identifying programs not being executed by said registered receiver processes.

46. The apparatus for interprocess message routing between a sender process and a plurality of receiver processes as set forth in claim 28, wherein said apparatus further comprises     second registering means for registering said sender process, said second registering means registering a signaling way describing how said sender process is to be signaled, said second registering means comprising a fourth interface for receiving registrations from said sender process; and     replying means coupled to said first selecting means for replying to said received messages with a message class attributes equaling "Request".

47. The apparatus for interprocess message routing between a sender process and a plurality of receiver processes as set forth in claim 46, wherein said replying means for replying to said received "Request" messages replies to said "Request" messages with no selected handler process.

48. The apparatus for interprocess message routing between a sender process and a plurality of receiver processes as set forth in claim 47, wherein said received "Request" messages with no selected handler process comprise said received "Request" messages having message attributes non-matching against registered message patterns and non-matching against message signatures contained in program type definitions.

49. The apparatus for interprocess message routing between a sender process and a plurality of receiver processes as set forth in claim 48, wherein said received "Request" messages with no selected handler process further comprise said received "Request" messages having said message attributes matching against said message signatures, said matching message signatures further comprising message dispositions equaling "Discard", and being contained in said program types identifying programs not being executed by said registered receiver processes.

50. The apparatus for interprocess message routing between a sender process and a plurality of receiver processes as set forth in claim 47, wherein said replying means for replying to said received "Request" messages further replies to said "Request" messages with selected handler process.

51. The apparatus for interprocess message routing between a sender process and a plurality of receiver processes as set forth in claim 46, wherein said replying means for replying to said received "Request" messages comprises, generating means coupled to said first selecting means for generating reply messages to said received "Request" messages;

second selecting means coupled to said generating means for selecting said registered received processes to receive said reply messages;

second queuing means coupled to said second selecting means for queuing said reply messages to at least one undelivered messages queue, for subsequent retrieval by said sender process and said selected receiver processes;

second signaling means coupled to said second queuing means for signaling said sender process and said selected receiver processes regarding the availability of said queued reply messages; and second delivering means for delivering said queued reply messages upon request of said signaled processes, to said requesting receiver processes, said second delivering means comprising an fifth interface for receiving said delivery requests.

52. The apparatus for interprocess message routing between a sender process and a plurality of receiver processes as set forth in claim 51, wherein said generating means for generating reply messages comprises an updating means coupled to said first selecting means for updating message attributes of said received "Request" messages with no selected handler process, said message attributes being updated comprising message state attributes being updated to "Failed".

53. The apparatus for interprocess message routing between a sender process and a plurality of receiver processes as set forth in claim 52, wherein said updating means further dequeues said received "Request" messages with selected handler process from result pending messages queues, and updates message attributes of said received "Request" messages with selected handler process, said updating means comprising a sixth interface for receiving results from said handler processes, and having access to said result pending messages queues, said message attributes being updated according to said results, said message attributes being updated comprising message state attributes being updated to one of a plurality of message states comprising a state of "Handled" and a state of "Failed".

54. The apparatus for interprocess message routing between a sender process and a plurality of receiver processes as set forth in claim 53, wherein said generating means for generating reply messages further comprises a third queuing means coupled to said first selecting means for queuing another copy of each of said received "Request" messages with selected handler processes, pending receipt of said results from said handler processes.

55. The apparatus for interprocess message routing between a sender process and a plurality of receiver processes as set forth in claim 54, wherein said third queuing means for queuing copies of said received "Request" messages with selected handler processes queues said copies in at least one result pending messages queue, said third queuing means comprising said first queuing means.

* * * * *